United States Patent
Saripalli et al.

(10) Patent No.: US 7,366,809 B2
(45) Date of Patent: Apr. 29, 2008

(54) PIPELINED STOP, START, ADDRESS BYTE, AND DATA BYTE TECHNIQUE AND CIRCUIT FOR I²C LOGIC SYSTEM

(75) Inventors: Ramesh Saripalli, Tucson, AZ (US); Hugo Cheung, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 186 days.

(21) Appl. No.: 11/032,272

(22) Filed: Jan. 10, 2005

(65) Prior Publication Data

US 2005/0228915 A1    Oct. 13, 2005

Related U.S. Application Data

(60) Provisional application No. 60/561,460, filed on Apr. 12, 2004.

(51) Int. Cl.
*G06F 13/00* (2006.01)
*G06F 13/42* (2006.01)

(52) U.S. Cl. ........................................ 710/110; 710/105
(58) Field of Classification Search ................ 710/110, 710/5, 6, 58, 100, 104, 105, 107; 712/E9.045, 712/E9.062, E9.064
See application file for complete search history.

(56) References Cited

U.S. PATENT DOCUMENTS

| 6,253,268 | B1* | 6/2001 | Bjorkengren et al. | ....... 710/105 |
|---|---|---|---|---|
| 6,842,806 | B2* | 1/2005 | Ervin | ........................ 710/110 |
| 6,874,047 | B1* | 3/2005 | Duguay et al. | ............. 710/100 |
| 7,028,209 | B2* | 4/2006 | Mosley et al. | .............. 713/500 |
| 2005/0091427 | A1* | 4/2005 | Yoshida et al. | ............... 710/48 |

OTHER PUBLICATIONS

I2C Bus Specification, Version 2.1, Jan. 2000.*
"The I²C Bus Specification", Version 2.1, Philips Semiconductors, Jan. 2000.

* cited by examiner

*Primary Examiner*—Christopher E. Lee
*Assistant Examiner*—Trisha Vu
(74) *Attorney, Agent, or Firm*—Wade J. Brady, III; Frederick J. Telecky, Jr.

(57) ABSTRACT

Data speed in an I²C system is increased by operating a master CPU (110) to pipeline a stop/start/address byte transfer instruction by setting a stop bit, setting a start bit, and storing an address byte, operating a control circuit (87) in response to the stop bit to automatically send a stop condition on the I²C bus, operating a timing circuit (40) to count a predetermined delay from the stop condition, and operating the control circuit (87) in response to the start bit to automatically send a start condition on I²C bus after the delay has elapsed. The control circuit (87) automatically sends the address byte on the I²C bus after the start condition has been sent.

18 Claims, 5 Drawing Sheets

PIPELINED STOP, START, ADDRESS BYTE, AND DATA BYTE TECHNIQUE AND CIRCUIT FOR I²C LOGIC SYSTEM

CROSS REFERENCE TO RELATED APPLICATION

This application claims the benefit of prior filed co-pending U.S. provisional application Ser. No. 60/561,460 filed Apr. 12, 2004 entitled "PIPELINED STOP, START AND ADDRESS WRITE CIRCUITRY AND METHOD FOR I²C LOGIC SYSTEM" by Saripalli et al.

BACKGROUND OF THE INVENTION

The present invention relates generally to pipelining of start, stop, address byte and data byte transfer instructions in I²C logic systems.

Conventional I²C systems are described in detail in the publication "THE I²C-BUS SPECIFICATION, VERSION 2.1, JANUARY 2000", which is incorporated herein by reference. I²C devices ordinarily have a CPU (although some "stand-alone" I²C devices, such as an ADC, may not include a CPU). I²C devices are usually implemented at a certain protocol level that may be dependent on their main intended use. An I²C device functioning in its slave mode is often referred to simply as a "slave", and an I² device functioning in its master mode is often referred to simply as a "master".

The closest prior art is believed to be the assignee's MSC 1211 product, relevant parts of which are shown in prior art FIGS. 1-4. It may be helpful to provide a description of the basic structure and operation of the prior art before proceeding to a description of the present invention. Referring to prior art FIG. 1, I²C system 1 includes a serial data bus conductor 2 which conducts the serial clock data signal SDA and a serial clock conductor 3 that conducts the serial clock signal SCK. I²C system 1 also includes an I²C slave device 5 and an I²C master device 10, both of which are connected to SCK conductor 3 and SDA conductor 2. The serial data bus conductor 2 and serial clock conductor 3 are collectively referred to as the "I²C bus".

Figure 1:
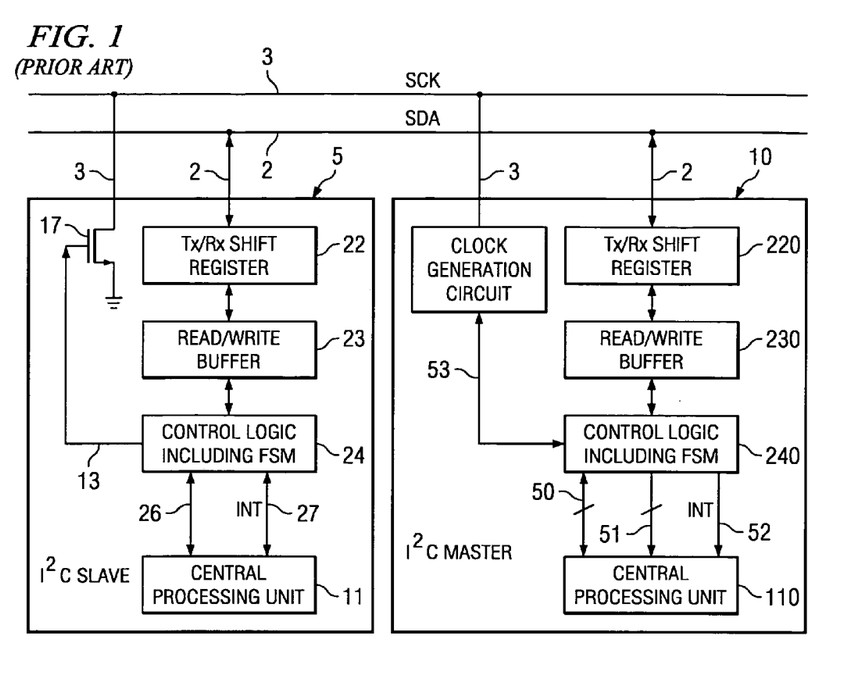
FIG. 1 is a block diagram of a prior art I²C system.

Slave device 5 includes an N-channel transistor 17 having its drain connected to SCK conductor 3 and its source connected to a ground conductor. The gate of transistor 17 is connected to control logic circuit 24, which includes a finite state machine (FSM). Slave device 5 includes a transmit/receive shift register 22 connected to SDA conductor 2. Transmit/receive shift register 22 is bidirectionally coupled by multiple conductors to a read/write buffer 23, which is coupled by multiple conductors to control logic circuit 24. Control logic circuit 24 can produce an interrupt signal INT on conductor 27, which is connected to an interrupt input of slave CPU 11. Control logic circuit 24 also is bidirectionally coupled via multiple control conductors 26 to slave CPU 11.

Figure 3:
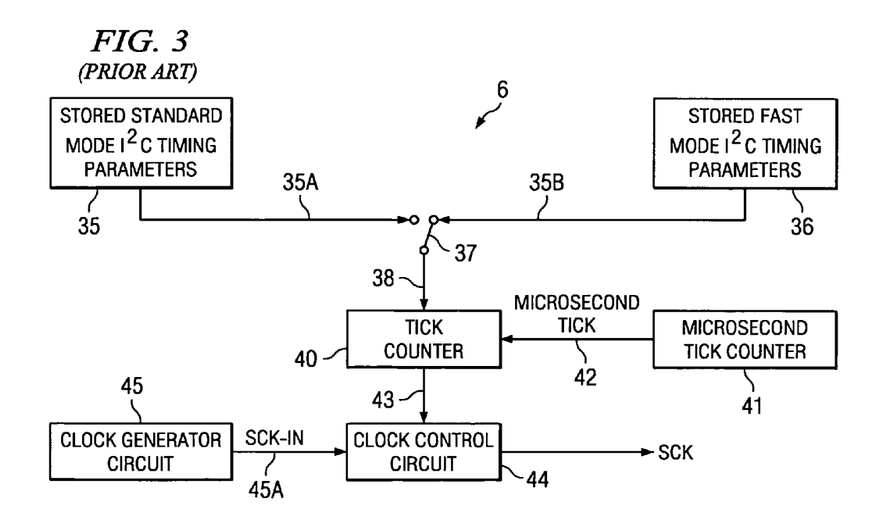
FIG. 3 is a block diagram of prior art circuitry for providing accurate control of delays between various edges of the serial clock SCK and the serial data SDA signals in the I²C system of FIG. 1 for both standard mode and fast mode operation of an I²C system.

Master device 10 includes clock generation circuitry 6, shown in detail in FIG. 3. Clock generation circuitry 6 is coupled to SCK conductor 3. Clock generation circuitry 6 is bidirectionally coupled by multiple conductors 53 to a control logic circuit 240, which includes a conventional finite state machine. Control logic circuit 240 produces an interrupt signal INT on conductor 52, which is connected to an interrupt input of a master CPU 110. Master CPU 110 receives control signals on multiple conductors 51 from control logic 240 and sends control signals on multiple conductors 50 to control logic circuit 240. Master device 10 also includes a transmit/receive shift register 220 which is bidirectionally coupled to SDA conductor 2. Transmit/receive shift register 220 is also bidirectionally coupled by multiple conductors to a read/write buffer 230, which is bidirectionally coupled by multiple conductors to control logic circuit 240.

By way of definition, the term "I²C hardware" is used herein to refer to all of the circuitry of an I²C device except its CPU. For example, in FIG. 1, I²C device 5 acts as a slave and includes a CPU 10 and "I²C hardware" including transmit/receive shift register 22, read/write buffer 23, and control logic 24. I²C device 10 acts as a master and includes a CPU 110 and I²C hardware including clock generation circuitry 6, transmit/receive shift register 220, read/write buffer 230, and control logic 240.

Also by way of definition, it is to be understood that each time the CPU of an I²C device "executes" an instruction of a user program, the CPU "sends" one or more control signals or "commands" to the I²C hardware of that I²C device, and the I²C hardware acts in response to such control signals or commands. Whenever the I²C hardware performs a function that results in a signal or signal "condition" being transmitted on the I²C bus 2,3, the signal or signal condition is said to be "sent to" or "sent on" the I²C bus. That is, an instruction of a user program is accessed and immediately "executed" by the CPU which then "sends" a corresponding control signal or command to the I²C hardware, which responds by "sending" a corresponding signal or "condition" on the I²C bus 2,3. Usually, the I²C hardware provides feedback to the CPU (either by directly interrupting the CPU or by being polled by the CPU, both of which are very time-consuming) to let the CPU know the status of the I²C hardware so it can operate to control the I²C hardware and/or execute the next instruction.

It should be understood that the amount of time required for the I²C hardware to respond to the commands bears no relation to the amount of time required for the CPU to execute the instruction, because the time required for the CPU to execute the instruction depends on the rate at which the CPU is clocked but the time required for the I²C hardware to respond to the command could be much shorter or much longer than the amount of time required for the I²C hardware to respond to the commands.

Figure 2:
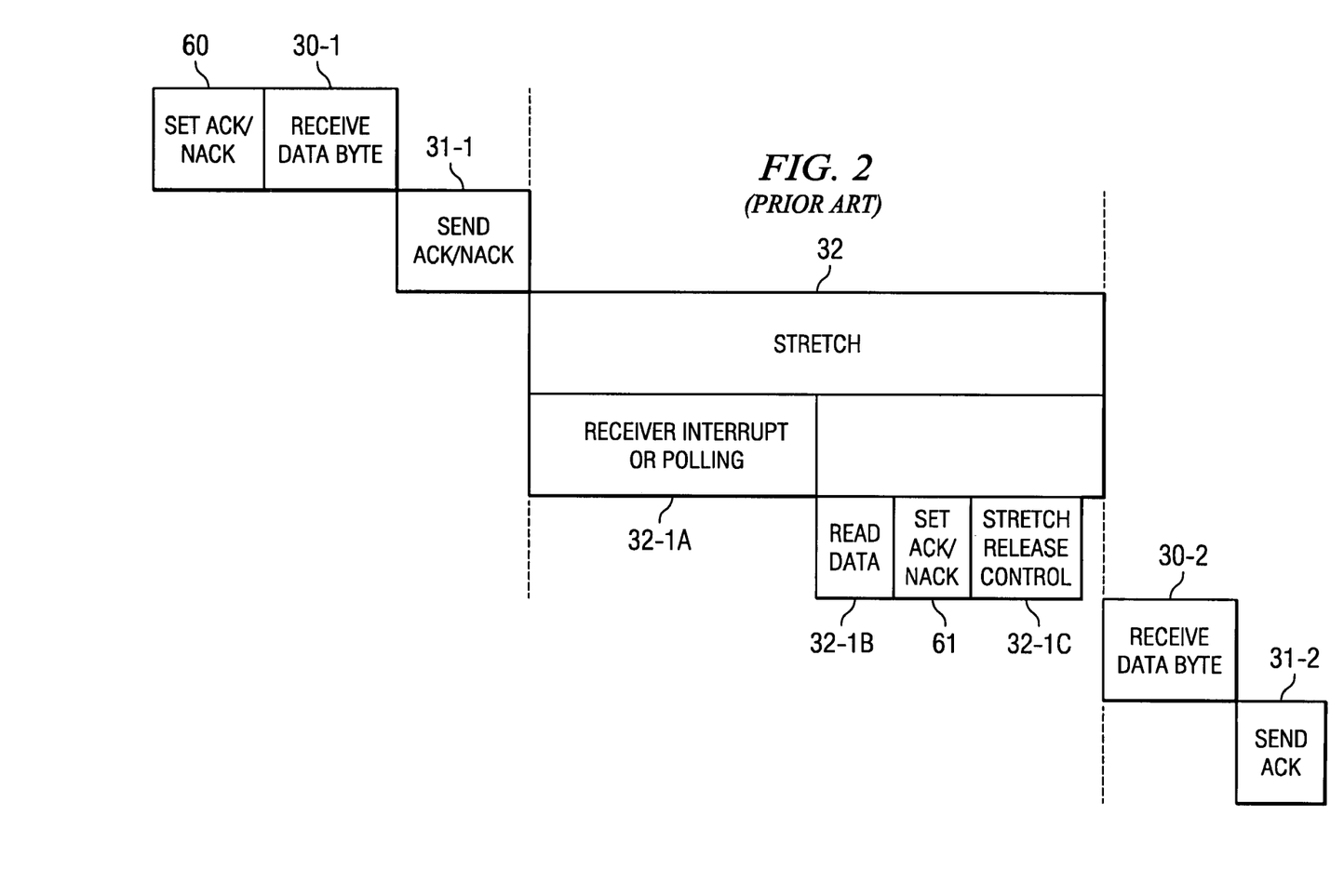
FIG. 2 is a timing diagram useful in explaining basic operation of a conventional I²C system.

FIG. 2 illustrates a typical sequence of events during operation of a conventional I²C system including a master and a slave to help in understanding basic I²C system operation. Both a master and a slave can function in a receive mode or a send mode. In every data time frame there are nine clock pulses, the first eight clock pulses of which are used by the master to send the data byte. During the ninth clock pulse a "0" is produced on SDA conductor 2 by the slave if an acknowledge signal ACK is to be sent by the slave, or alternatively, a "1" is produced on the SDA conductor by the slave if a "not acknowledge" signal or condition NACK (hereinafter referred to as a "not acknowledge signal NACK") is to be sent by the slave to inform the master that the slave is not acknowledging that it received the data byte and is not accepting or reading the data byte being transmitted on SDA conductor 2. (An example of the process of the slave reading a data byte includes the slave CPU 11 in FIG. 1 performing the step of reading R/W buffer 23.) If no slave is trying to pull SDA conductor 2 low (i.e., a NACK signal is being sent), SDA conductor 2 assumes a high value, i.e., a "1" level, and if SDA conductor 2 is low during the ninth clock pulse of the present data time frame, that means the slave is notifying the master that it has received the data byte sent by the master on SDA conductor 2.

The user software determines in advance whether the slave is to send either an acknowledge signal ACK or a "not acknowledge" signal NACK on the SDA conductor during the ninth clock pulse of the present data time frame.

In FIG. 2, block 60 indicates whether the user program has determined whether or not the slave will respond by sending either a previously set up acknowledge signal ACK or "not acknowledge" signal NACK. After the data byte has been received by the slave, it will then "send" whichever of the ACK signal or NACK signal was previously set up in accordance with block 60. As indicated in block 30-1 of FIG. 2, the slave in a conventional I²C system receives a data byte transmitted by the master during the first eight SCK pulses of a 9-pulse data time-frame. Referring to block 31-1, the slave sends either an acknowledge signal ACK on SDA conductor 2 to let the master know that the slave has received the transmit data byte or a "not acknowledge" signal NACK to let the master know that the slave is not accepting or reading any data byte being sent by the master on SDA conductor 2.

Referring to block 32-1A in FIG. 2, after receiving the data byte and sending an acknowledge signal ACK, the I²C slave hardware does not know what its CPU will do next. For example, the slave may not yet have a next byte available to be sent to the master. What the slave can then do is to stretch clock SCK to indicate that the master must wait, and then the slave can interrupt the slave CPU and inform it that the slave has received the current byte and has sent an acknowledge signal ACK. To determine if the slave has received the data byte and to determine whether the slave can send an acknowledge signal, slave CPU 11 can either service an interrupt or perform a polling operation. If control logic 24 sends an interrupt signal INT to slave CPU 11, it reads the data byte that it has received, as indicated in block 32-1B. Once the data byte is read, slave CPU 11, at the beginning of block 32-1C, also sets up the slave as indicated in block 61 of FIG. 2 to send an acknowledge signal ACK or a "not acknowledge" signal or condition NACK after it receives the next data byte. Then, as indicated in block 32-1C, the slave "releases the stretch" of SCK.

Note that after the slave has received the first data byte, it does not always need to set up the acknowledge/"not acknowledge" decision again for each of the multiple successive data bytes to be received by the slave. For example, if the slave CPU wants the slave to receive 10 successive data bytes, the slave does not need to set up the acknowledge/"not acknowledge" decision again for each of the remaining 9 data bytes. The ACK/NACK bit (i.e., the ninth bit of each data time frame) remains set until it is cleared. The slave therefore will send an acknowledge signal ACK for each of the 10 data bytes without the acknowledge/"not acknowledge" bit being reset. After the stretch release referred to in block 32-1C of FIG. 2, the master then can send the next data byte on SDA conductor 2, and the process in the slave is repeated for the next data byte, as indicated in blocks 30-2 and 31-2.

As general background, it should be understood that the above described process is a "handshaking" process wherein the slave stretches clock signal SCK to inform the master to not send any more SCK pulses, and the slave control logic then sends an interrupt signal INT to its own slave CPU 11 and informs slave CPU 11 that a data byte has been received and the clock SCK has been stretched. Then the slave CPU 11 reads that data byte and sets up the appropriate conditions for the next event to happen (e.g., the slave CPU sets up the slave to send either an ACK signal or a NACK signal after the next data byte is received as indicated in block 61, after the present stretch of SCK has been released,). Then, when the slave is ready it "releases the stretch" of SCK. The master then can continue control of clock signal SCK and data signal SDA.

A "back-to-back stop and start operation" in a conventional I²C system such as the above mentioned MSC 1211 includes executing a stop instruction followed, after a particular delay, by executing a separate start instruction. When master 10 is communicating to slave 5, at the end of that communication master 10 sends a stop condition on I²C bus 2,3 before attempting to initiate communication with another slave by means of another start instruction. Master 10 executes a "combined" stop and start instruction wherein a stop instruction and a start instruction are pipelined. First, the pipelined stop instruction is executed. The control logic/finite state machine 87 does not have to notify master CPU 110 that the stop condition has been sent to I²C bus 2,3 as is required in earlier I²C systems. Instead, control logic/finite state machine 87 automatically sends the start condition on I²C 2,3 after a predetermined delay. Then a start condition is automatically sent on I²C bus 2,3, in response to the pipelined start instruction. This avoids the separate programming and executing of stop and start instructions required by earlier I²C systems.

The logic circuitry of a prior art I²C system such as the MSC 1211 cannot simultaneously handle the combination of a start instruction, a stop instruction, and an address byte instruction and/or a data transfer instruction. The CPU must be notified by the I²C hardware that execution of the start instruction is complete before the CPU can execute the address byte transfer instruction. Also, the software executed by a CPU of an I²C device has to wait until the stop, start and address byte instructions have been executed and acted on by the I²C hardware before the data byte transfer instruction is executed and before the required signals are sent by the CPU to the I²C hardware. This requirement reduces the I²C bus speed and the data throughput rate of the I²C system.

Figure 4:
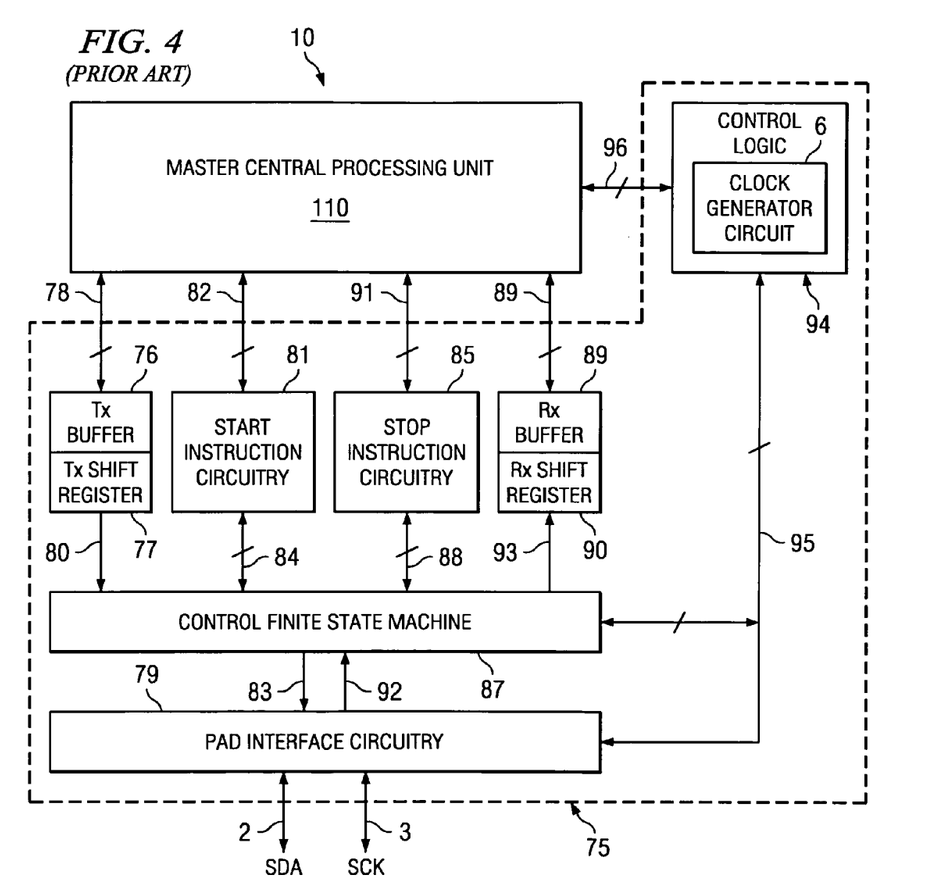
FIG. 4 is a block diagram of the prior art, including pipeline circuitry associated with executing back-to-back stop and start instruction and a subsequent address byte instruction and data transfer instruction.

The circuitry shown in FIG. 4 is included in the assignee's above mentioned MSC 1211 product for allowing master 10 to "pipeline" a stop instruction and a start instruction so the programmer can provide a stop instruction and the following start instruction at the same point of an application program to be executed by master 10 and thereby avoid the inconvenience of providing and executing the start instruction at a later point in the application program.

Referring to FIG. 4, master 10 includes a master CPU 110. A transmit buffer (Tx buffer) 76 is bidirectionally coupled by conductors 78 to master CPU 110. Transmit buffer 76 is coupled to a transmit shift register (Tx shift reg.) 77. Transmit shift register 77 is coupled by a conductor 80 to a "control finite state machine 87", hereinafter referred to simply as "finite state machine 87".

Control logic 94 feeds back signals to finite state machine 87 via a bus 95 to enable it to make logical decisions according to the present circumstances. Data can be serially coupled from finite state machine 87 to conventional pad interface circuitry 79 by means of conductor 83. Clock generation circuit 6 of prior art FIG. 3 is included in control logic 94. Master CPU 110 is bidirectionally coupled by conductors 82 to start instruction circuitry 81, which is also bidirectionally coupled by conductors 84 to finite state machine 87. Master CPU 110 also is bidirectionally coupled by conductors 91 to stop instruction circuitry 85. Stop instruction circuitry 85 is bidirectionally coupled by conductors 88 to finite state machine 87.

A receive buffer circuit (Rx buffer) 89 is bidirectionally coupled by conductors 89 to master CPU 110, and also is coupled to a receive shift register (Rx shift register) 90. Receive shift register 90 is coupled by conductor 93 to finite state machine 87. Conductor 92 conducts serial data from pad interface circuitry 79 to finite state machine 87. Pad interface circuitry 79 is bidirectionally coupled to SDA conductor 2 and SCK conductor 3. Master CPU 110 is bidirectionally coupled by conductors 96 to control logic 94. Control logic 94 is bidirectionally coupled by various conductors 95 to finite state machine 87 and pad interface circuitry 79.

SDA conductor 2 and SCK conductor 3 are connected to corresponding integrated circuit bonding pads (not shown). Control signals coupled to the pad interface circuitry 79 for each of the SCK and SDA bidirectional bonding pads, respectively, including internal enable signals on conductors 95 applied to control pad interface circuitry 79, which allow the bidirectional SDA conductor and the bidirectional SCK conductor to function both as serial input inputs and serial outputs of master 10.

Above-mentioned stop instruction circuit 85 includes a stop instruction bit, which, when set by master CPU 110, causes a stop condition to be generated on I²C bus 2,3 at the appropriate time by master 10. Similarly, start instruction circuit 81 includes a start instruction bit, which, when set by master CPU 110, causes the following start condition to be generated later on I²C bus 2,3, after the appropriate delay time has been counted by tick counter 40. Master CPU 110 can set the start bit in block 81 while it is sending or receiving a data byte. Once the start bit is set, master CPU 110 waits to be informed that the current byte transaction to be finished, and then executes the start instruction.

In response to a combined stop/start instruction, master CPU 110 can, according to I²C protocol, write into start instruction circuitry 81 and stop instruction circuitry 85, and also into transmit buffer 76 and receive buffer 89. A stop instruction must be executed first, and the execution of a start instruction must follow the execution of a stop instruction by a predetermined delay. Execution of the start instruction must be followed by other communication, i.e., transmission of an address byte and one or more data bytes.

The logic circuitry in block 75 determines if master CPU 110 is writing "parallel" instructions such as a combined stop/start instruction, wherein finite state machine 87 checks the parallel instructions in accordance with the present situation and accordingly sends appropriate timing information to master CPU 110 at times allowed by the I²C protocol. Finite state machine 87 can send signals, such as interrupt signals, to control logic 94, from which master CPU 110 can obtain appropriate information regarding when to later cause an address byte to be transmitted on SDA conductor 2.

Specifically, a stop condition is generated first, followed by a counting of the time required before execution of the next start condition can begin. The start condition then is sent on I²C bus 2,3. The counting referred to is based on the microsecond tick counter circuit 40 in FIG. 3, which is included in finite state machine 87. Tick counter 40 is loaded with the required amount of time to be counted from either block 35 or block 36 in FIG. 3, corresponding either to standard mode or fast mode I²C operation. The loaded times are then counted down by tick counter circuit 40 to determine the time intervals between the times at which instructions are set up and the times at which they are to be executed. After the required time interval is counted, the I²C hardware sends the start condition on I²C bus 2,3.

A known I²C protocol determines whether a byte is an address byte or a data byte, and finite state machine 87 always determines that an address byte is the first byte to be transmitted after a start condition has been sent on I²C bus 2,3, but has no other way of distinguishing between an address byte and the data byte.

In the receive mode, if receive buffer 89 is empty after a data byte has been received by master 10 and loaded into receive shift register 90, the data byte is transferred to receive buffer 89, and master 10 can continue to receive a next data byte during to the next eight CLK pulses.

To understand how the transmit and receive shift registers operate, assume that master 10 wants to transmit a byte on SDA conductor 2. To accomplish this, master CPU 110 writes the byte to transmit buffer 76. Transmit buffer 76 checks to see if transmit shift register 77 is presently empty, and if it is empty, transmit buffer 76 sends the byte to transmit shift register 77. Transmit shift register 77 then signals finite state machine 87 to determine whether master 10 is in the correct mode to send a byte. If master 10 currently is in its receive mode, it is receiving data from a slave, in which case finite state machine 87 does not allow master 10 to receive data on SDA conductor 2. Finite state machine 87 waits for the data byte being received to be available to master CPU 110. When this has occurred, receive shift register 90 signals finite state machine 87, causing it to resume generation of SCK to allow master 10 to transmit the byte on SDA conductor 2.

As explained above, the prior art MSC 1211 has to wait until master CPU 110 has been interrupted and notified that the start condition has been sent on I²C bus 2,3 and before CPU 110 can write the address byte into the transmit buffer 76. It is important to note that the MSC 1211 only combines a stop instruction and start instruction as a single instruction. However, the MSC 1211 can not combine or pipeline the start instruction and address byte together. The I²C hardware must inform master CPU 110, either by means of an interrupt operation or a polling operation, that the start condition has been sent on I²C bus 2,3 before beginning execution of an address byte instruction. Similarly, the I²C hardware must inform master CPU 110, either by means of an interrupt operation or a polling operation, that the sending of the address byte on the I²C bus is complete and that an acknowledge (ACK) or not acknowledge (NACK) message has been received from a receiving I²C slave device before beginning execution of a data byte transfer instruction.

It would be desirable to avoid the interrupt or polling operation and the delay required in prior art devices (such as the MSC 1211) prior to sending an address byte on the I²C bus. It also would be desirable to avoid the interrupt operation or polling operation and the delay required in prior art devices (such as the MSC 1211) prior to sending a data byte on the I²C bus.

Thus, there is an unmet need for a circuit and method for avoiding the interrupt or polling operation and the delay required in the prior art I²C systems immediately before sending an address byte on the I²C bus.

There also is an unmet need for a circuit and method for avoiding the interrupt operation or polling operation and the delay required in the prior art I²C systems immediately before sending a data byte on the I²C bus.

There also is an unmet need for reducing the number of interrupts required in the prior art I²C systems immediately before sending data bytes on the I²C bus.

SUMMARY OF THE INVENTION

It is an object of the invention to provide a circuit and method for avoiding the interrupt or polling operation and the delay required in the prior art I²C systems immediately before sending an address byte on the I²C bus.

It is another object of the invention to provide a circuit and method for avoiding the interrupt operation or polling operation and the delay required in the prior art I²C systems immediately before sending a data byte on the I²C bus.

It is another object of the invention to provide a circuit and method for reducing the number of interrupts required in the prior art I²C systems immediately before sending data bytes on the I²C bus.

Briefly described, and in accordance with one embodiment, the present invention provides a system and method for improving data speed in an I²C system including a system for improving data speed in an I²C system including a serial clock conductor (3) for conducting a serial clock signal SCK and a serial data conductor (2) for conducting a serial data signal SDA. The system includes a master device (10A) coupled to the serial clock conductor (3) and the serial data conductor (2) for sending and receiving data signals on the serial data conductor (2) and generating the serial clock signal SCK on the serial clock conductor (3), the master device (10A) including a master CPU (110), a control circuit (87) coupled to the master CPU (110) and the serial clock conductor (3) and the serial data conductor (2), a clock generation circuit (6). The control circuit (87) is coupled to the master CPU (110), and includes a finite state machine. A start instruction circuit (81) is coupled between the master CPU (110) and the control circuit (87), a stop instruction circuit (85) is coupled between the master CPU (110) and the control circuit (87), and an address instruction circuit (134) is coupled between the master CPU (110) and the control circuit (87). The master CPU (110) executes a combined stop/start/address instruction by setting a stop bit in the stop instruction circuit (85), setting a start bit in the start instruction circuit (81), and storing an address byte in the address instruction circuit (134). The control circuit (87) causes a stop condition to be sent via the interface circuit (79) to the serial clock conductor (3) and the serial data conductor (2) in response to the stop bit. The control circuit (87) causes a start condition to be automatically sent via the interface circuit (79) to the serial clock conductor (3) and the serial data conductor (2) in response to the start bit a predetermined delay after the stop condition has been sent. The control circuit (87) operates in response to the address instruction circuit (134) to cause the address byte to be automatically sent via the interface circuit (79) to the serial clock conductor (3) and the serial data conductor (2) after the start condition has been sent. In the described embodiment, the control circuit (87) includes an interface circuit (79) coupling the control circuit (87) to serial clock conductor (3) and the serial data conductor (2), wherein the start condition is automatically sent via the interface circuit (79) and the address byte is automatically sent via the interface circuit (79). Timing circuitry (40) is coupled to the control circuit (87) for determining intervals between times at which pipeline instructions are set up and times at which conditions corresponding to the pipeline instructions, respectively, are sent on the serial clock conductor (3) and serial data conductor (2). In the described embodiment, a transmit buffer circuit (76) coupled between the master CPU (110) and the control circuit (87) for receiving a data byte from the master CPU (110).

In the described embodiment, the master CPU (110) executes a combined stop/start/address transfer/data byte transfer instruction by also storing a data byte in the transmit buffer circuit (76). The control circuit (87) operates in response to the transmit buffer circuit (76) to cause the data byte to be automatically sent via the interface circuit (79) to the serial clock conductor (3) and the serial data conductor (2) after the address byte has been sent.

DETAILED DESCRIPTION OF THE PREFERRED EMBODIMENTS

Figure 5:
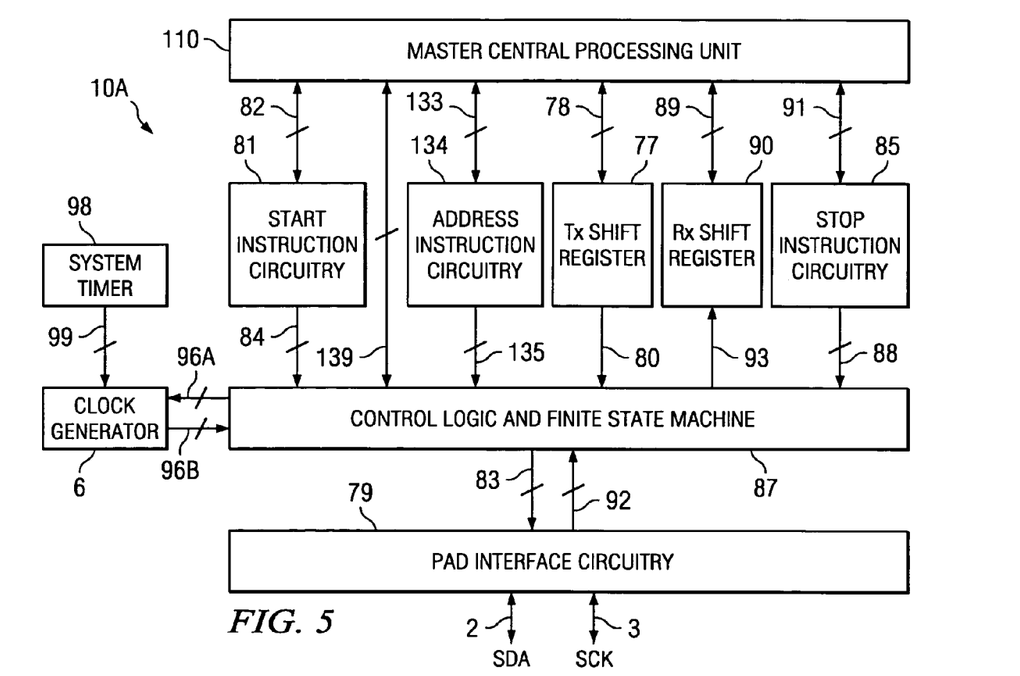
FIG. 5 is a block diagram of pipeline circuitry of the present invention for executing back-to-back stop, start, address byte and data byte transfer instructions according to the present invention.

Referring to FIG. 5, master I²C device 10 of FIG. 1 can be an improved master I²C device 10A which includes a master CPU 110. A transmit shift register 77 is bidirectionally coupled by conductors 78 to master CPU 110. Transmit shift register 77 is coupled by a conductor 80 to a control logic/control finite state machine 87. A receive buffer circuit (Rx buffer) 89 is bidirectionally coupled by conductors 89 to master CPU 110, and also is coupled to a receive shift register (Rx shift register) 90. Receive shift register 90 is coupled by conductor 93 to control logic/finite state machine 87. A conductor of a multi-conductor bus 92 conducts serial data from pad interface circuitry 79 to control logic/finite state machine 87. A conductor of a multi-conductor bus 83 conducts serial data from control logic/finite state machine 87.

In accordance with the present invention, address instruction circuitry 134 is bidirectionally coupled by conductors 133 to master CPU 110, and is coupled by multiple conductors 135 to control logic/finite state machine 87. Also, master CPU 110 is bidirectionally coupled by conductors 139 to control logic/finite state machine 87, which includes circuitry which can be the same as or similar to that in control logic circuit 94 of prior art FIG. 4. Data is written in parallel format to transmit shift register 77 by master CPU 110, then is sent in serial format via conductor 80 to control logic/finite state machine 87. Similarly, serial data is sent by control logic/finite state machine 87 on conductor 93 to receive shift register 90, transferred in parallel format from receive shift register 90 to receive buffer 89, and then is sent in parallel format via bus 89 to master CPU 110.

In contrast, in prior art FIG. 4, the address byte and the data byte are processed, one at a time, through the same transmit shift register 77.

Pad interface circuitry 79 is bidirectionally coupled to SDA conductor 2 and SCK conductor 3. As in prior art FIG. 4, master CPU 110 is bidirectionally coupled by conductors 82 to start instruction circuitry 81, which is bidirectionally coupled by conductors 84 to control logic/finite state machine 87. Master CPU 110 also is bidirectionally coupled by conductors 91 to stop instruction circuitry 85. Stop instruction circuitry 85 is bidirectionally coupled by conductors 88 to control logic/finite state machine 87.

Each of SCK conductor 3 and SDA conductor 2 is connected to a corresponding integrated circuit bonding pad (not shown) and also is connected to a corresponding conventional enabled buffer amplifier (not shown) which has an inverting buffer enable input, an input terminal IN connected to control logic and finite state machine 87, and output terminal OUT connected to the bonding pad. The output terminal OUT is connected by a switch to a pullup resistor, the other terminal of which is connected to a power supply voltage. The output terminal OUT also is connected to conduct a signal to an input terminal of control logic and finite state machine 87. An output of control logic/finite state machine 87 is applied to the input terminal IN of the buffer amplifier, which is enabled by the buffer enable signal provided by control logic/finite state machine 87. The switch is controlled by a pullup switch enable signal provided by control logic/finite state machine 87. The signal on the bonding pad is the signal produced by the buffer amplifier output terminal OUT if the buffer amplifier is enabled, or if an external signal is applied to the bonding pad, the signal on the bonding pad is applied to an input terminal of control logic and finite state machine 87.

A clock generator 6 is coupled to control logic/finite state machine 87 by multi-conductor buses 96A and 96B and also is coupled by conductors 99 to a system timer 98. Clock generator 6 includes known circuitry shown in prior art FIG. 3. System timer 98 is a time base circuit which generates time base signals that are utilized by the microsecond tick counter 41 of prior art FIG. 3 to enable it to generate various timing signals on conductors 96B for use by control logic/finite state machine 87 and to enable clock generator 6 to synchronously receive various control signals on conductors 96A from control logic/finite state machine 87. Microsecond tick counter 41 of FIG. 3 can be considered to be part of system timer 98. Bus 99 in FIG. 5 includes a number of conductors that may conduct various reference timing signals, including conductor 42 of FIG. 3 which conducts the signal MICROSECOND TICK.

By way of definition, the term "instruction" refers to a programming code that is executed by master CPU 110. A corresponding "condition" refers to a signal or group of signals produced on I²C bus 2,3 by various I²C hardware in response to the execution of the instruction. A single or combined stop/start instruction is executed by master CPU 110 of prior art FIG. 4 to cause control logic/finite state machine 87 to first send a stop condition on I²C bus 2,3, and then after a correct amount of separation time has elapsed between a stop condition and a start condition, control logic/finite state machine 87 then automatically sends a the start condition on I²C bus 2,3, and the present invention provides a single combined "stop/start/address" instruction and a single or combined "stop/start/address/data byte" instruction which may be executed by the master controller 10A of FIG. 5.

The function of above described address instruction circuitry 134 of the present invention is different than the function utilized in the prior art for generating a start condition on I²C bus 2,3 in the circuit shown in prior art FIG. 4. As previously indicated, in the circuit of prior art FIG. 4, finite state machine 87 sends a start condition on I²C bus 2,3.

When master CPU 110 of previously described prior art FIG. 4 executes the start instruction, finite state machine 87 first checks to determine if I²C bus 2,3 is free (i.e., is not being used by any other master I²C device and that there is no other communication occurring on I²C bus 2,3), and as soon as the I²C bus is free, finite state machine 87 transmits the start condition onto the I²C bus and then interrupts the master CPU to inform it that finite state machine 87 has completed sending of the start condition. Master CPU 110 of prior art FIG. 4 then services that interrupt by executing an instruction to write an address byte, via transmit buffer 76 and transmit shift register 77, to control finite state machine 87, which then shifts the address byte onto SDA conductor 2.

Finite state machine 87 of prior art FIG. 4 also interrupts master CPU 110 to notify it that the start condition has been sent on I²C bus 2,3. Master CPU 110 of prior art FIG. 4 then writes an address byte to finite state machine 87 via transmit buffer 76 and transmit shift register 77. Finite state machine 87 then transmits the address byte to the I²C bus. Then finite state machine 87 of prior art FIG. 4 interrupts master CPU 110 to notify it that the address byte has been sent on I²C bus 2,3. Master CPU 110 then writes the data byte to finite state machine 87 via the same transmit buffer 76 and transmit shift register 77. Finite state machine 87 then transfers the data byte onto I²C bus 2,3. Finite state machine 87 of prior art FIG. 4 then interrupts master CPU 110 to inform it that the data byte has now been transferred onto the I²C bus. Master CPU 110 then causes finite state machine 87 to send a stop condition on I²C bus 2,3.

In contrast, in the new circuit of FIG. 5 the address byte is initially written into a pipeline location 134 at the same time the stop bit of stop instruction circuitry 85 and the start bit of start instruction circuitry 81 are set by master CPU 110. Every time the start command is performed, the address byte will be later automatically sent on SDA conductor 2, without master CPU 110 first needing to be informed that the start condition has been sent on I²C bus 2,3. Specifically, the stop instruction is pipelined in stop instruction circuitry 85, the start instruction is pipelined in start instruction circuitry 81, and the address byte is pipelined in address instruction circuitry 134. After the start condition is sent by means of control logic/finite state machine 87 onto I²C bus 2,3 the pipelined address byte is automatically, without control logic/finite state machine 87 interrupting master CPU 110, transmitted from address instruction circuitry 134 to control logic/finite state machine 87 instead of being written into transmit shift register 77 in response to the master CPU being interrupted by the I²C hardware as required in the system of prior art FIG. 4. That is, the I²C hardware detects that the start condition has been transmitted on I²C bus 2,3 and then instructs the control logic/finite state machine 87 that it is time for the address byte to be sent on I²C bus 2,3.

After the address byte has been transmitted onto I²C bus 2,3 by control logic/finite state machine 87, the receiving I²C slave device will send either an ACK signal or a NACK signal on I²C bus 2,3 and accordingly control logic/finite state machine 87 will interrupt master CPU 110 to inform it that this has occurred. Note that transmit shift register 77 in FIG. 5 is used for sending only data, but not address bytes, from master CPU 110 to control logic/finite state machine 87 in FIG. 5. In contrast, in the circuitry of prior art FIG. 4, both the address byte and the data byte art transmitted at substantially different times through transmit shift register 77 to control logic/finite state machine 87.

In the circuitry of FIG. 5, once the address byte is transmitted via I²C bus 2,3 and the ACK signal or NACK signal is received from the receiving slave device, then control logic/finite state machine 87 interrupts master CPU 110 to inform it that the address byte has been sent on I²C bus 23 and that the ACK signal or NACK signal has been received.

Master CPU 110 then writes data, via transmit shift register 77, to control logic/finite state machine 87, which then transmits the data on SDA conductor 2, and interrupts master CPU 110 to inform it that the data byte has been transferred onto I²C bus 2,3.

In contrast to master I²C device 110 of FIG. 4, master CPU 110 of I²C device 10 of FIG. 5 does not to need to know that the start condition has already been sent on the I²C bus before causing the address byte to be sent on I²C bus 23. Instead, after master CPU 110 in FIG. 5 executes the start instruction, the address byte is later automatically sent on I²C bus 2,3 without master CPU 110 being interrupted.

At the beginning of the execution of a single combined "stop/start/address" instruction, master CPU 110 pipelines the stop instruction, the start instruction, and an address byte into stop instruction circuitry 85, start instruction circuitry 81, and address instruction circuitry 134, respectively. Master CPU 110 then can continue executing other tasks, while control logic/finite state machine 87 automatically sends the start condition on I²C bus 2,3 and then immediately and automatically sends the address byte on I²C bus 2,3, without needing to interrupt master CPU 110 and without needing to wait for the address byte to be written by master CPU 110 into the transmit buffer 76 and then be transferred to the transmit shift register 77 of the prior art circuitry of FIG. 4.

This procedure avoids the delay in the prior art MSC 1211 associated with interrupting master CPU 110 to notify it that the start condition has been sent on the I²C bus and avoids waiting for master CPU 110 to write the address byte into transmit buffer 76 and transferred it into transmit shift register 77. The need for software to cause master CPU 110 in FIG. 4 to service an interrupt and then write the address byte into transmit buffer 76 and into transmit shift register 77 is avoided.

In the circuitry of FIG. 5 a single data byte can also be pipelined simultaneously with the pipelining of the stop instruction in stop instruction circuitry 85, the start instruction in start instruction circuitry 81, and the address byte in address instruction circuitry 134, respectively. Specifically, in the circuitry of FIG. 5 a single byte of data can be pipelined in transmit register 77.

At the beginning of the execution of a single combined "stop/start/address/data byte" instruction, master CPU 110 pipelines the stop instruction, the start instruction, an address byte, and a data byte into stop instruction circuitry 85, start instruction circuitry 81, address instruction circuitry 134, and transmit shift register 77, respectively. Master CPU 110 then can continue executing other tasks.

Figure 6A:
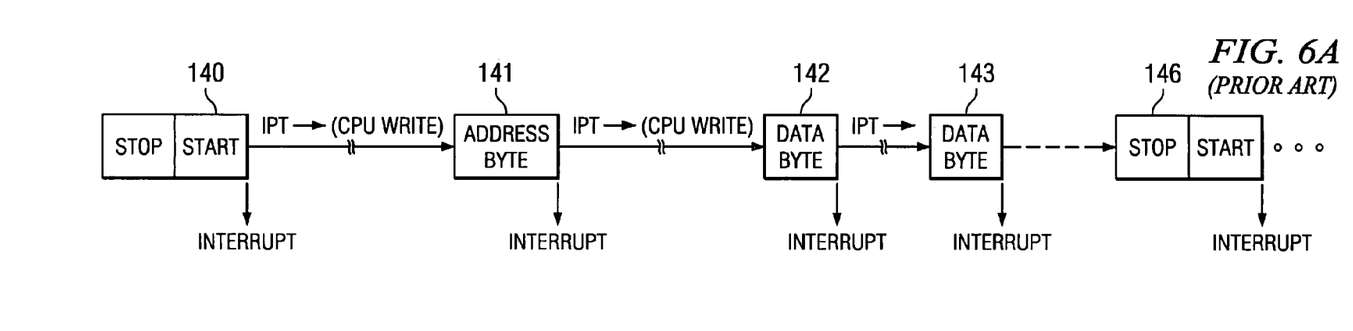
FIGS. 6A and 6B are similar timing diagrams useful in contrasting the present invention with the prior art.
Figure 6B:
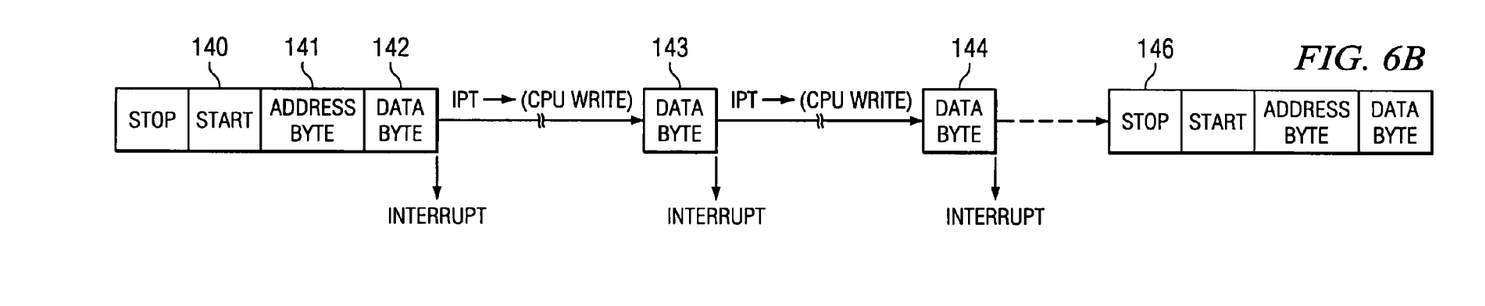

Referring to the timing diagram of FIG. 6B, the start command indicated in block 140, the address byte indicated in block 141, and the data byte indicated in block 142 all are pipelined in the manner explained above, and an interruption of master CPU 110 is performed only after a corresponding start condition, address byte, and data byte all have been sent on I²C bus 2,3. After the long "IPT" time (interrupt processor time) associated with servicing of an interrupt request elapses, master CPU 110 can, if desired, execute another data byte instruction to cause a second data byte 143 to be sent on I²C bus 2,3, after which another interruption of master CPU 110 is performed, and similarly, if desired, this procedure can be repeated for additional data bytes such as data byte 144 to be sent on I²C bus 2,3. After the last desired data byte has been sent on I²C bus 2,3, a stop instruction 146 can be simultaneously pipelined along with another start instruction, address instruction, and data byte instruction, as previously described.

In the prior art technique illustrated in FIG. 6A, master CPU 110 is interrupted after the start command 140, before the address byte instruction 141 is executed. Therefore, the long IPT time must elapse before the beginning of the execution of the address byte instruction required to send the address byte 141 on I²C bus 2,3 can even begin. Similarly, another long IPT time therefore must elapse before the beginning of the execution of the data byte instruction to send data byte 142 on I²C bus 2,3 can begin.

This is in direct contrast to the prior art MSC 1211, in which an interrupting of the master CPU 110 in FIG. 4 is required after the ACK or NACK signal has been received from the receiving I²C device and after the address byte has been sent on the I²C bus before master CPU 110 can write the single data byte into transmit shift register 77 so it can be transferred to finite state machine 87 of FIG. 4.

Master CPU 110 in FIG. 5 thus can avoid the overhead and delay of the prior art circuit of FIG. 4 associated with interrupting of master CPU 110 before writing the single data byte into the transmit shift register 77.

In contrast, in the above mentioned prior art MSC 1211 the address byte cannot be pipelined at the same time as the start instruction. Instead, the MSC 1211 has to wait until the start condition has been sent on the I²C bus and the master CPU 110 has been so notified before it can write the address byte into the transmit buffer 76. Note that although the MSC 1211 combines and pipelines the start instruction and address byte as a single instruction, it does not also simultaneously pipeline the start instruction and the address byte. In the MSC 1211 the master CPU 110 can pipeline the start instruction and address byte together, but nevertheless must inform the CPU of the sending of the start condition on the I²C bus and the receiving of the ACK or NACK message from the receiving I²C slave device before the address byte can be sent on I²C bus 2,3. The present invention avoids the software overhead and delay associated with that procedure.

Thus, in one embodiment of the invention a single combined stop/start instruction is used in conjunction with a pipelined address write instruction to, in effect, accomplish execution of a stop instruction automatically followed by a start instruction, automatically followed by transmission of an address byte. The stop instruction and start instruction are pipelined in stop instruction circuitry 85 and start instruction circuitry 81, respectively, and the address byte instruction is pipelined in address instruction circuitry 134. A user program being executed by a master device 10 can execute the single stop/start instruction to cause a start condition to be automatically generated.

In another embodiment, the transmission of the address byte on I²C bus 2,3 is immediately and automatically followed by transmission of a data byte. The data byte is pipelined in transmit shift register 77. The programmer can provide the stop, start, address byte, and data byte instructions as pipelined instructions at a desired point in the user program being executed by master CPU 110. The resulting pipelined instructions are automatically set up so as to be executed in the proper sequence and at the proper times.

Therefore, the programmer is not restricted to providing these instructions as individual instructions only at particular separate points in the user program corresponding to times after which certain prior instructions and signal conditions have been completed.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. A system for improving data speed in an I²C system including a serial clock conductor for conducting a serial clock signal SCK and a serial data conductor for conducting a serial data signal SDA, the system comprising:
   (a) a master device coupled to the serial clock conductor and the serial data conductor for sending and receiving data signals on the serial data conductor and generating the serial clock signal SCK on the serial clock conductor, the master device including a master CPU, a control circuit coupled to the master CPU and the serial data conductor, and a clock generation circuit, the control circuit being coupled to the master CPU, the control circuit including a finite state machine;
   (b) a start instruction circuit coupled between the master CPU and the control circuit, a stop instruction circuit coupled between the master CPU and the control circuit, and an address instruction circuit coupled between the master CPU and the control circuit;
   (c) the master CPU executing a combined stop/start/address instruction by setting a stop bit in the stop instruction circuit, setting a start bit in the start instruction circuit, and storing an address byte in the address instruction circuit;
   (d) the control circuit causing a stop condition to be sent via the interface circuit to the serial clock conductor and the serial data conductor in response to the stop bit, the control circuit causing a start condition to be automatically sent via the interface circuit to the serial clock conductor and the serial data conductor in response to the start bit a predetermined delay after the stop condition has been sent; and
   (e) the control circuit operating in response to the address instruction circuit, without the master CPU being first notified that the start condition has been sent, to cause the address byte to be automatically sent via the interface circuit to the serial clock conductor and the serial data conductor after the start condition has been sent.

2. The system of claim 1 wherein the interface circuit couples the control circuit to serial clock conductor and the serial data conductor, wherein the start condition is automatically sent via the interface circuit and the address byte is automatically sent via the interface circuit.

3. The system of claim 2 wherein the clock generation circuit includes timing circuitry coupled to the control circuit for determining intervals between times at which pipeline instructions are set up and times at which conditions corresponding to the pipeline instructions, respectively, are sent on the serial clock conductor and serial data conductor.

4. The system of claim 3 wherein the timing circuitry determines an interval between the time at which the stop condition is sent and a time at which the start condition should be sent, and the control circuit operates in response to the pipelined start bit and the timing circuitry to cause the start condition to be automatically sent after the interval has elapsed.

5. The system of claim 4 wherein the timing circuitry determines an interval between the time at which the start condition is sent and a time at which the address byte should be sent, and the control circuit operates in response to the pipelined address byte instruction and the timing circuitry to cause the address byte to be automatically sent after the interval has elapsed.

6. The system of claim 1 including a transmit shift register coupled between the master CPU and the control circuit for receiving a data byte from the master CPU.

7. A system for improving data speed in an I²C system including a serial clock conductor for conducting a serial clock signal SCK and a serial data conductor for conducting a serial data signal SDA, the system comprising:
   (a) a master device coupled to the serial clock conductor and the serial data conductor for sending and receiving data signals on the serial data conductor and generating the serial clock signal SCK on the serial clock conductor, the master device including a master CPU, a control circuit coupled to the master CPU and the serial clock conductor and the serial data conductor, a clock generation circuit, and an interface circuit coupling the control circuit to the serial clock conductor and the serial data conductor, the control circuit being coupled to the master CPU, the control circuit including a finite state machine;
   (b) a start instruction circuit coupled between the master CPU and the control circuit, a stop instruction circuit coupled between the master CPU and the control circuit, a transmit shift register coupled between the master CPU and the control circuit, and an address instruction circuit coupled between the master CPU and the control circuit;
   (c) the master CPU executing a combined stop/start/address transfer/data byte transfer instruction by setting a stop bit in the stop instruction circuit, setting a start bit in the start instruction circuit, storing an address byte in the address instruction circuit, and storing a data byte in the transmit shift register;
   (d) the control circuit causing a stop condition to be sent via the interface circuit to the serial clock conductor and the serial data conductor in response to the stop bit, the control circuit causing a start condition to be automatically sent via the interface circuit to the serial clock conductor and the serial data conductor in response to the start bit a predetermined delay after the stop condition has been sent;
   (e) the control circuit operating in response to the address instruction circuit, without the master CPU being frist notified that the start condition has been sent, to cause the address byte to be automatically sent via the interface circuit to the serial clock conductor and the serial data conductor after the start condition has been sent; and
   (f) the control circuit operating in response to the transmit shift register to cause the data byte to be automatically sent via the interface circuit to the serial clock conductor and the serial data conductor after the address byte has been sent.

8. The system of claim 7 wherein the clock generation circuit includes timing circuitry coupled to the control circuit for determining intervals between times at which pipeline instructions are set up and times at which they are executed.

9. The system of claim 8 wherein the timing circuitry determines an interval between the time at which the stop condition is sent and a time at which the start condition should be sent, and the control circuit operates in response to the pipelined start bit and the timing circuitry to cause the start condition to be automatically sent after the interval has elapsed.

10. The system of claim 9 wherein the timing circuitry determines an interval between the time at which the start condition is sent and a time at which the address byte should be sent, and the control circuit operates in response to the pipelined address byte instruction and the timing circuitry to cause the address byte to be automatically sent after the interval has elapsed.

11. A method for improving data speed in an I²C system including a serial clock conductor for conducting a serial clock signal SCK and a serial data conductor for conducting a serial data signal SDA, the method comprising:
   (a) providing a master device coupled to the serial clock conductor and the serial data conductor for sending and receiving data signals on the serial data conductor and generating the serial clock signal SCK on the serial clock conductor, the master device including a master CPU, a control circuit coupled to the master CPU and the serial clock conductor and the serial data conductor, a clock generation circuit, the control circuit being coupled to the master CPU, the control circuit including a finite state machine;
   (b) operating the master CPU to execute a stop/start/ address byte transfer instruction by setting a stop bit in the stop instruction circuit, setting a start bit in a start instruction circuit, and storing an address byte in an address instruction circuit;
   (c) operating the control circuit in response to the stop bit to send a stop condition on the serial clock conductor and the serial data conductor;
   (d) operating the control circuit in response to the start bit to automatically send a start condition on the serial clock conductor and the serial data conductor a predetermined amount of time after the sending of the stop condition; and
   (e) operating the control circuit in response to the address instruction circuit, without the master CPU being notified that the start condition has been sent, to automatically the address byte on the serial clock conductor and the serial data conductor after the start bit has been sent.

12. The method of claim 11 including operating the clock generation circuit to determine intervals between times at which pipeline instructions are set up and times at which conditions corresponding to the pipeline instructions, respectively, are sent on the serial clock conductor and serial data conductor.

13. A method for improving data speed in an I²C system including a serial clock conductor for conducting a serial clock signal SCK and a serial data conductor for conducting a serial data signal SDA, the method comprising:
   (a) providing a master device coupled to the serial clock conductor and the serial data conductor for sending and receiving data signals on the serial data conductor and generating the serial clock signal SCK on the serial clock conductor, the master device including a master CPU, a control circuit coupled to the master CPU and the serial clock conductor and the serial data conductor, a clock generation circuit, the control circuit being coupled to the master CPU, the control circuit including a finite state machine;
   (b) operating the master CPU to execute a stop/start/ address byte transfer/data byte transfer instruction by setting a stop bit in the stop instruction circuit, setting a start bit in a start instruction circuit, storing an address byte in an address instruction circuit, and storing a data byte in a data instruction circuit;
   (c) operating the control circuit in response to the stop bit to send a stop condition on the serial clock conductor and the serial data conductor;
   (d) operating the control circuit in response to the start bit to automatically send a start condition on the serial clock conductor and the serial data conductor a predetermined amount of time after the sending of the stop condition;
   (e) operating the control circuit in response to the address instruction circuit, without the master CPU being frist notified that the start condition has been sent, to automatically send the address byte on the serial clock conductor on the serial data conductor after the start bit has been sent; and
   (f) operating the control circuit in response to the data instruction circuit to automatically send the data byte on the serial clock conductor and the serial data conductor after the address byte has been sent.

14. The method of claim 13 including operating the clock generation circuit to determine intervals between times at which pipeline instructions are set up and times at which conditions corresponding to the pipeline instructions, respectively, are sent on the serial clock conductor and serial data conductor.

15. Circuitry in an I²C system including a serial clock conductor for conducting a serial clock signal SCK and a serial data conductor for conducting a serial data signal SDA, the circuitry comprising:
   (a) a master device coupled to the serial clock conductor and the serial data conductor for sending and receiving data signals on the serial data conductor and generating the serial clock signal SCK on the serial clock conductor, the master device including a master CPU, a control circuit coupled to the master CPU and the serial clock conductor and the serial data conductor, a clock generation circuit, the control circuit being coupled to the master CPU, the control circuit including a finite state machine;
   (b) means for operating the master CPU to execute a combined stop/start/address byte transfer instruction by setting a stop bit in the stop instruction circuit, setting a start bit in a start instruction circuit, and storing an address byte in an address instruction circuit;
   (c) means for operating the control circuit in response to the stop bit to send a stop condition on the serial clock conductor and the serial data conductor;
   (d) means for operating the control circuit in response to the start bit to automatically send a start condition on the serial clock conductor and the serial data conductor a predetermined amount of time after the sending of the stop condition; and
   (e) means for operating the control circuit in response to the address instruction circuit, without the master CPU being frist notified that the start condition has been sent, to automatically the address byte on the serial clock conductor and the serial data conductor after the start bit has been sent.

16. The circuitry of claim 15 including means for determining intervals between times at which pipeline instructions are set up and times at which conditions corresponding to the pipeline instructions, respectively, are sent on the serial clock conductor and serial data conductor.

17. Circuitry in an I²C system including a serial clock conductor for conducting a serial clock signal SCK and a serial data conductor for conducting a serial data signal SDA, comprising:
 (a) a master device coupled to the serial clock conductor and the serial data conductor for sending and receiving data signals on the serial data conductor and generating the serial clock signal SCK on the serial clock conductor, the master device including a master CPU, a control circuit coupled to the master CPU and the serial clock conductor and the serial data conductor, a clock generation circuit, the control circuit being coupled to the master CPU, the control circuit including a finite state machine;
 (b) means for operating the master CPU to execute a combined stop/start/address byte transfer/data byte transfer instruction by setting a stop bit in the stop instruction circuit, setting a start bit in a start instruction circuit, storing an address byte in an address instruction circuit, and storing a data byte in a data instruction circuit;
 (c) means for operating the control circuit in response to the stop bit to send a stop condition on the serial clock conductor and the serial data conductor;
 (d) means for operating the control circuit in response to the start bit to automatically send a start condition on the serial clock conductor and the serial data conductor a predetermined amount of time after the sending of the stop condition;
 (e) means for operating the control circuit in response to the address instruction circuit, without the master CPU being frist notified that the start condition has been sent, to automatically send the address byte on the serial clock conductor on the serial data conductor after the start bit has been sent; and
 (f) means for operating the control circuit in response to the data instruction circuit to automatically send the data byte on the serial clock conductor and the serial data conductor after the address byte has been sent.

18. The circuitry of claim 17 including means for determining intervals between times at which pipeline instructions are set up and times at which conditions corresponding to the pipeline instructions, respectively, are sent on the serial clock conductor and serial data conductor.

* * * * *